United States Patent
Ogiso

(10) Patent No.: US 8,452,474 B2
(45) Date of Patent: May 28, 2013

(54) CONTROL DEVICE FOR HYBRID VEHICLE AND CONTROL METHOD THEREFOR

(75) Inventor: Makoto Ogiso, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/450,923

(22) Filed: Apr. 19, 2012

(65) Prior Publication Data

US 2012/0209466 A1    Aug. 16, 2012

Related U.S. Application Data

(62) Division of application No. 12/308,706, filed as application No. PCT/IB2007/002782 on Sep. 25, 2007, now abandoned.

(30) Foreign Application Priority Data

Sep. 26, 2006  (JP) .................................. 2006-260691

(51) Int. Cl.
 *B60W 20/00* (2006.01)
(52) U.S. Cl.
 USPC ................. 701/22; 701/320; 60/274; 60/280; 60/285; 60/295; 180/65.21; 180/65.265
(58) Field of Classification Search
 USPC .............. 701/22, 320; 60/274, 280, 285, 295; 180/65.21, 65.265
 See application file for complete search history.

(56) References Cited

U.S. PATENT DOCUMENTS

| | | | | |
|---|---|---|---|---|
| 5,472,673 A * | 12/1995 | Goto et al. | ..................... | 422/169 |
| 5,483,795 A * | 1/1996 | Katoh et al. | ..................... | 60/276 |
| 5,642,705 A * | 7/1997 | Morikawa et al. | ............ | 123/300 |
| 5,771,685 A * | 6/1998 | Hepburn | ......................... | 60/274 |
| 5,778,666 A * | 7/1998 | Cullen et al. | ..................... | 60/274 |
| 6,173,571 B1* | 1/2001 | Kaneko et al. | ................... | 60/286 |
| 6,434,928 B1 | 8/2002 | Manaka | | |
| 7,093,432 B2* | 8/2006 | Hanaoka et al. | ................. | 60/301 |
| 7,159,393 B2* | 1/2007 | Blomquist et al. | .............. | 60/302 |
| 7,178,326 B2* | 2/2007 | Kojima et al. | .................. | 60/278 |
| 7,213,397 B2 | 5/2007 | Hu et al. | | |
| 7,575,931 B2* | 8/2009 | Steichen et al. | .............. | 436/118 |
| 7,587,888 B2* | 9/2009 | Shirakawa | ........................ | 60/278 |
| 7,814,743 B2* | 10/2010 | Inoue et al. | ..................... | 60/284 |
| 8,015,808 B2* | 9/2011 | Keefer et al. | ................... | 60/517 |

(Continued)

FOREIGN PATENT DOCUMENTS

| | | |
|---|---|---|
| EP | 1 197 642 A2 | 4/2002 |
| FR | 2 816 662 A1 | 5/2002 |
| JP | A 2002-242721 | 8/2002 |

OTHER PUBLICATIONS

Office Action dated Jan. 23, 2012 issued in U.S. Appl. No. 12/308,706.

*Primary Examiner* — Tuan C. To
(74) *Attorney, Agent, or Firm* — Oliff & Berridge, PLC

(57) ABSTRACT

In a hybrid vehicle that includes an internal combustion engine in conjunction with an electric motor, when one of a process of regenerating the purification capacity of an exhaust gas purifying device and a process of charging a battery is performed, the presence or absence of a request to perform the other process is determined so that the two processes may be performed as simultaneously as possible to reduce deterioration in driveability and in the fuel efficiency as much as possible.

8 Claims, 5 Drawing Sheets

U.S. PATENT DOCUMENTS

| | | | |
|---|---|---|---|
| 8,020,652 B2 * | 9/2011 | Bryan et al. | 180/65.285 |
| 8,165,738 B2 * | 4/2012 | Akaki et al. | 701/22 |
| 8,166,750 B2 * | 5/2012 | Bruck | 60/297 |
| 8,206,470 B1 * | 6/2012 | Jacobson | 44/387 |
| 2003/0221420 A1 * | 12/2003 | Jobson et al. | 60/285 |
| 2004/0045280 A1 * | 3/2004 | Nishiyama et al. | 60/278 |
| 2006/0042587 A1 | 3/2006 | Ellinger et al. | |
| 2007/0082783 A1 | 4/2007 | Hu et al. | |

* cited by examiner

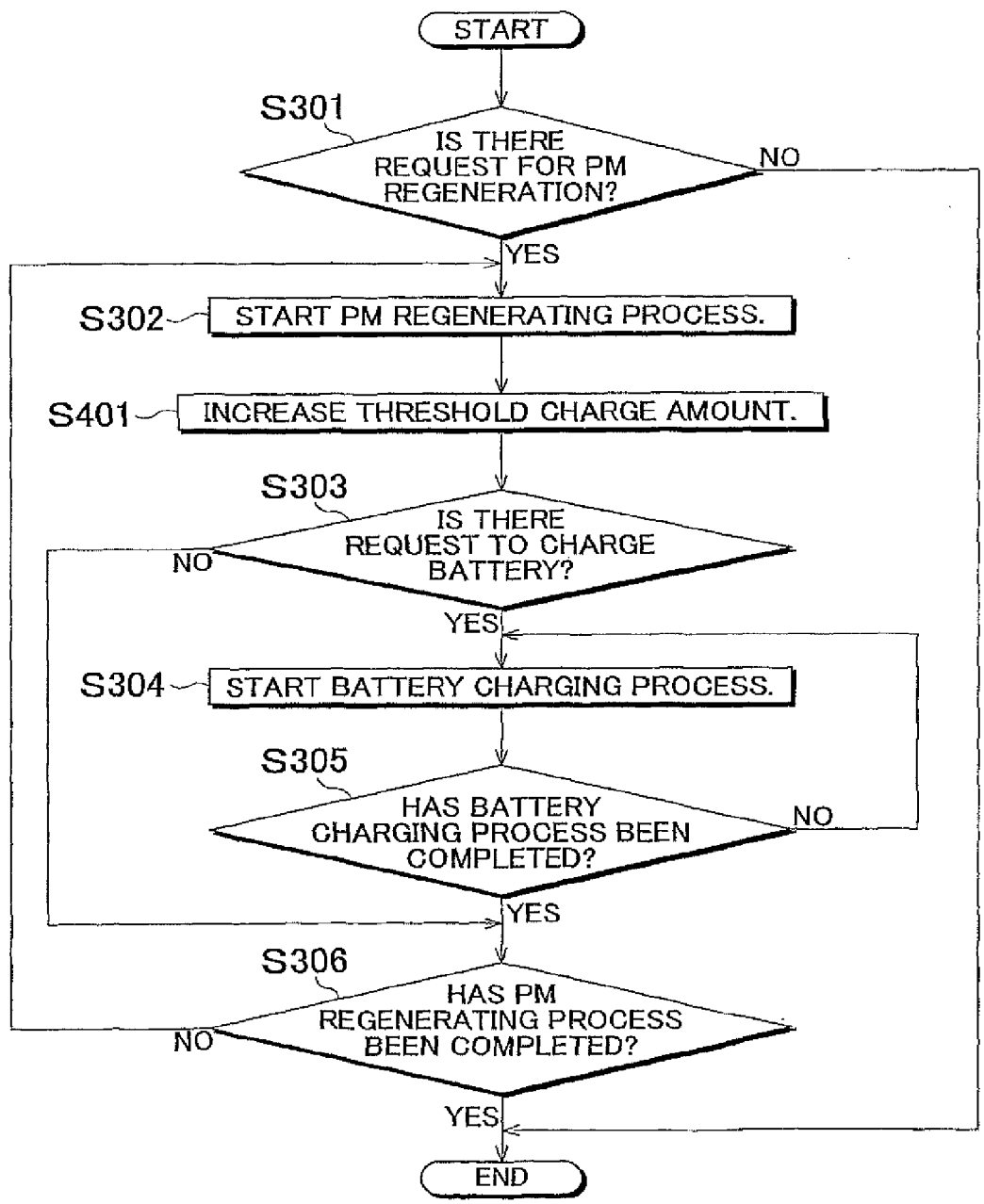

CONTROL DEVICE FOR HYBRID VEHICLE AND CONTROL METHOD THEREFOR

This is a Divisional of application Ser. No. 12/308,706 filed Dec. 22, 2008. The disclosure of the prior application is hereby incorporate by reference herein in its entirety.

BACKGROUND OF THE INVENTION

1. Field of the Invention

The present invention relates to a control device for a hybrid vehicle and a control method therefor, and, more particularly, to a control device for regenerating the purification capacity of an exhaust gas purifying device and for charging a battery, and a control method therefor.

2. Description of the Related Art

In recent years, hybrid vehicles which have an internal combustion engine combined with an electric motor and runs on the output power from the internal combustion engine in conjunction or combination with the output power from the electric motor are in practical use. In such hybrid vehicles, the internal combustion engine is operated intermittently as needed and is selectively operable in high-efficiency operating ranges. Therefore, the hybrid vehicles have advantages in terms of fuel efficiency and exhaust gas purification performance as compared with vehicles, which run on only the output power from an internal combustion engine.

However, even the hybrid vehicles cannot run without emitting exhaust gas derived from the operation of the internal combustion engine, and require an exhaust gas purifying device for purifying the exhaust gas from the internal combustion engine.

As the exhaust gas purifying device, a storage-reduction type NOx catalyst for purifying NOx in exhaust gas from an internal combustion engine (which is hereinafter referred to also as "NOx catalyst") and a particulate filter for purifying particulate matter in exhaust gas (which is hereinafter referred to also as "filter") are known.

As for the NOx catalyst, a process in which the temperature of the NOx catalyst bed is increased and a reducing agent is supplied to the NOx catalyst (which is hereinafter referred to as "SOx regenerating process") is performed to eliminate SOx poisoning, which is a phenomenon where SOx in the exhaust gas is stored in the NOx catalyst and reduces the storage capacity of the NOx catalyst.

As for the filter, when a large amount of collected particulate matter (PM) is accumulated, the filter is clogged and the back pressure in the exhaust gas is increased to the extent that the engine performance is reduced. Therefore, a process of increasing the temperature of the filter is performed by, for example, increasing the temperature of exhaust gas to be introduced into the filter to remove the collected particulate matter by oxidation (which is hereinafter referred to as "PM regenerating process").

In the SOx regenerating process and the PM regenerating process, the engine load or the engine speed is set to a value greater than that during normal operation in order to increase the temperature of exhaust gas.

In addition, the above hybrid vehicles require a process of charging a battery for serving at least as an electric power source of the electric motor. In the battery charging process, the engine load or the engine speed is set to a value greater than that during normal operation as in the SOx regenerating process and the PM regenerating process. Therefore, every time any of the above processes is performed, the driveability and the fuel efficiency of the hybrid vehicle as a system may deteriorate.

SUMMARY OF THE INVENTION

The present invention provides for a process of charging a battery and a process of regenerating the purification capacity of an exhaust gas purifying device to be performed more efficiently in a hybrid vehicle that runs using an internal combustion engine in conjunction or combination with an electric motor to improve the driveability or the fuel efficiency of the hybrid vehicle.

One aspect of the present invention is that, in a hybrid vehicle, when one of a process of regenerating the purification capacity of an exhaust gas purifying device and a process of charging a battery is performed, the presence or absence of a request to perform the other process is determined so that the two processes can be performed as simultaneously as possible to reduce the opportunities for deterioration of the driveability and the fuel efficiency as much as possible.

More specifically, a first aspect of the present invention includes: an internal combustion engine; an electric motor operable by electric power to assist the output power of the internal combustion engine; an exhaust gas purifying device, provided in an exhaust passage, through which exhaust gas from the internal combustion engine flows to purify the exhaust gas flowing through the exhaust passage, the purification capacity of the exhaust gas purifying device being regenerated by a regenerating process; a battery for serving at least as a source of electric power to operate the electric motor and charged by electric power supplied during a charging process; a power generator for generating electric power proportional to the engine load or engine speed and supplying the electric power to the battery during the charging process; regenerating means for performing the regenerating process by increasing the engine load and/or engine speed based on a request to perform the regenerating process from the exhaust gas purifying device; and charging means for performing the charging process by increasing the engine load and/or engine speed based on a request to perform the charging process from the battery, and further includes at least either first multitasking means for performing the regenerating process and determining the presence or absence of a request to perform the charging process when there is a request to perform the regenerating process, or second multitasking means for performing the charging process and determining the presence or absence of a request to perform the regenerating process when there is a request to perform the charging process.

A second aspect of the present invention includes: an internal combustion engine; an electric motor operable by electric power to assist the output power of the internal combustion engine; an exhaust gas purifying device, provided in an exhaust passage, through which exhaust gas from the internal combustion engine flows to purify the exhaust gas flowing through the exhaust passage, the purification capacity of the exhaust gas purifying device being regenerated by a regenerating process; a battery for serving at least as a source of electric power to operate the electric motor and charged by electric power supplied during a charging process; a power generator for generating electric power proportional to the engine load or engine speed and supplying the electric power to the battery during the charging process; regenerating means for performing the regenerating process by increasing the engine load and/or engine speed based on a request to perform the regenerating process from the exhaust gas purifying device; and charging means for performing the charging process by increasing the engine load and/or engine speed based on a request to perform the charging process from the battery, and further includes at least either performing the regenerating process and determining the presence or absence of a request to perform the charging process when there is a request to perform the regenerating process, or performing the charging process and determining the presence or absence of a request to perform the regenerating process when there is a request to perform the charging process.

In a hybrid vehicle, the process of charging a battery and the process of regenerating the purification capacity of an exhaust gas purifying device must be performed. In the process of charging the battery, the engine load and/or engine speed are increased to increase the electricity that is generated by the power generator. Then, the battery is switched from a discharging state to a charging state and the electric power generated by the power generator is supplied to the battery. In the process of regenerating the purification capacity of the exhaust gas purifying device (more specifically, a PM regenerating process or an SOx regenerating process), the engine load and/or engine speed may be also increased to increase the temperature of exhaust gas in order to increase the temperature of the exhaust gas purifying device.

When the process of charging the battery and the process of regenerating the purification capacity of the exhaust gas purifying device are performed independently, the driveability or the fuel efficiency is adversely affected when either processes is performed and each process cannot be performed efficiently.

The control device for a hybrid vehicle of the present invention further includes at least either of first multitasking means for performing a PM regenerating process or SOx regenerating process, when there is a request to perform a PM regenerating process or SOx regenerating process, and determining the presence or absence of a request to perform a battery charging process, and second multitasking means for performing a battery charging process, when there is a request to perform a battery charging process, and determining the presence or absence of a request to perform a PM regenerating process or SOx regenerating process.

Therefore, since the energy increased by increasing the engine load and/or engine speed can be used for both the PM regenerating process or the SOx regenerating process and the battery charging process, the energy can be used effectively. As a result, the driveability and the fuel efficiency of the hybrid vehicle are improved.

In the aspect of the present invention, the first multitasking means may determine the presence or absence of a request to perform the charging process after relaxing a prescribed first execution condition to determine the presence or absence of a request to perform the charging process. In addition, the second multitasking means may determine the presence or absence of a request to perform the regenerating process after relaxing a prescribed second execution condition to determine the presence or absence of a request to perform the regenerating process.

When the PM regenerating process or the SOx regenerating process is performed, it is determined whether a request for the battery charging process has been issued. At this time, the first execution condition to determine whether to perform the battery charging process is relaxed. In other words, a state in which a request for the battery charging process is likely to be issued is established.

Similarly, when a battery charging process is performed, it is determined whether a request for the PM regenerating process or SOx regenerating process has been issued. At this time, the second execution condition to determine whether to issue a request for the PM regenerating process or SOx regenerating process is relaxed to establish a state in which a request for the PM regenerating process or SOx regenerating process is likely to be issued.

Therefore, the possibility that the battery charging process and the PM regenerating process or SOx regenerating process are performed simultaneously may be increased, and the driveability and the fuel efficiency of the hybrid vehicle can be improved more reliably.

The first execution condition is that the amount of charge in the battery is equal to or smaller than a prescribed charge amount, and the first multitasking means may determine the presence or absence of a request to perform the charging process after relaxing the prescribed first execution condition by increasing the value of the prescribed charge amount. The second execution condition is that the amount of matter to be purified accumulated in the exhaust gas purifying device is equal to or greater than a prescribed amount of accumulated matter, and the second multitasking means may determine the presence or absence of a request to perform a regenerating process after relaxing the prescribed second execution condition by decreasing the value of the prescribed amount of accumulated matter.

The means for solving the problem of the present invention can be used in combination with one another if at all possible.

The present invention improves the driveability or the fuel efficiency of a hybrid vehicle that runs using an internal combustion engine in conjunction with an electric motor by allowing a process of charging a battery and a process of regenerating the purification capacity of an exhaust gas purifying device to be performed more efficiently in the hybrid vehicle.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein:

FIG. 5 shows a flowchart of a PM regenerating routine 2 in the second embodiment of the present invention.

DETAILED DESCRIPTION OF EMBODIMENTS

Figure 1:
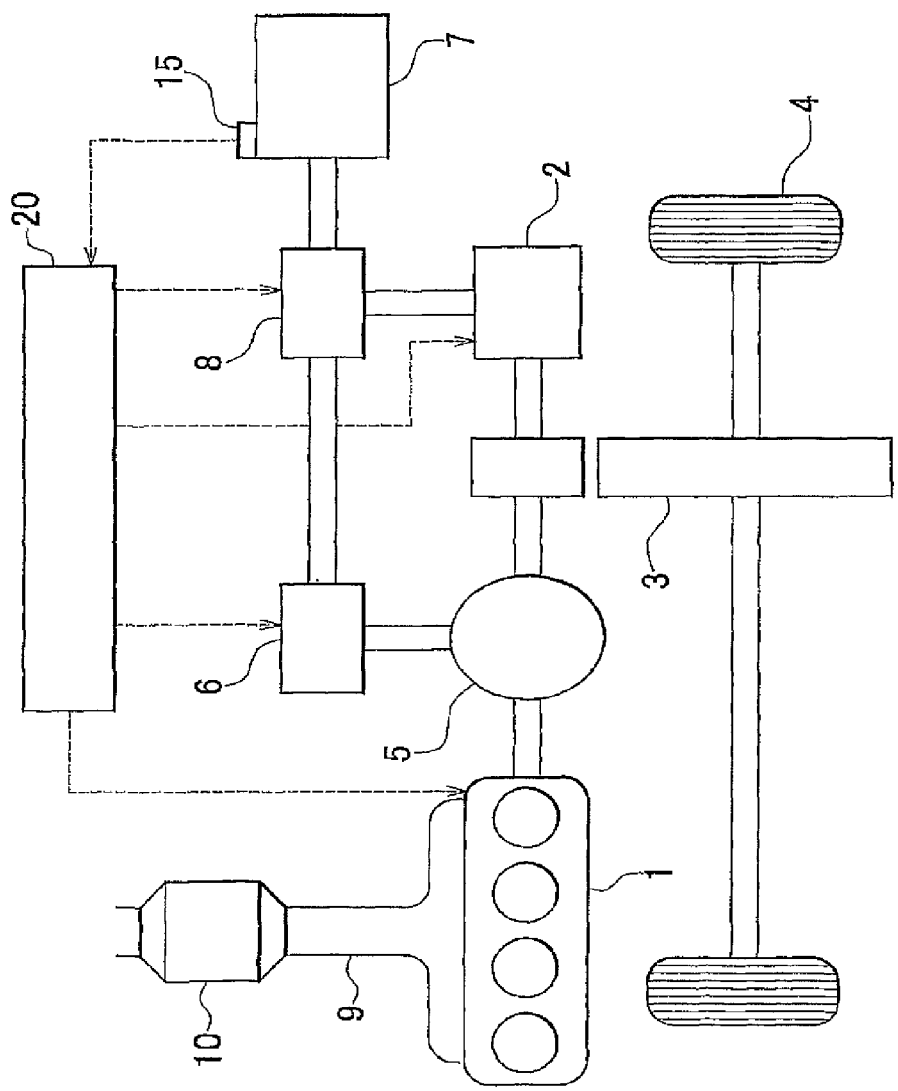
FIG. 1 illustrates the general configuration of a hybrid vehicle according to first and second embodiments of the present invention.

FIG. 1 illustrates the general configuration of a hybrid vehicle according to first and second embodiments of the present invention. The hybrid vehicle has an engine 1 and a motor 2 as driving sources.

The motor 2 is constituted as, for example, an AC motor, and has an output shaft connected to driving wheels 4 as a load via a reduction gear 3 so that the driving wheels 4 can be rotated by driving the motor 2. In addition, when the rotational energy of the driving wheels 4 is used to cause the motor 2 to generate electricity, electrical energy can be stored in a battery 7.

The engine 1 is an internal combustion engine that includes an output shaft connected to the driving wheels 4 via a power distribution mechanism 5 and a reduction gear 3 so that the driving wheels 4 can be also rotated by driving the engine 1. A generator 6 is constituted as, for example, an AC power generator, and has a rotating shaft connected to the output shaft of the engine 1 via the power distribution mechanism 5. The driving energy of the engine 1 can be therefore converted into electrical energy, and the electrical energy can be stored in the battery 7 or used to drive the motor 2. An inverter 8 is provided among the generator 6, the motor 2 and the battery 7, and the inverter 8 controls electric power. The battery 7 is provided with a charge amount sensor 15 for detecting the amount of charge in the battery.

This hybrid vehicle also has an exhaust pipe 9 connected to the engine 1 via an exhaust manifold, and a DPNR 10 in which a storage-reduction type NOx catalyst (which is hereinafter referred to as "NOx catalyst") for purifying NOx in exhaust gas from the engine 1 and a filter for collecting particulate matter in the exhaust gas are combined is provided in the exhaust pipe 9.

The hybrid vehicle is provided with an ECU (electronic control unit) 20 having an input/output device, a storage device (ROM, RAM, or the like) for storing control programs and control maps, a central processing unit (CPU), a timer counter, and so on (which are not shown). The ECU 20 is a device which comprehensively controls the engine 1, the generator 6, the motor 7 and so on based on information from various sensors including the charge amount sensor 15, and performs control on the process of charging the battery 7 and the process of regenerating the purification capacity of the DPNR 10.

In the DPNR 10, an SOx regenerating process in which the temperature of the NOx catalyst bed is increased and a reducing agent is supplied to the NOx catalyst is performed to eliminate SOx poisoning, which is a phenomenon where SOx in the exhaust gas is stored in the NOx catalyst and reduces the purification capacity of the NOx catalyst. Also, when a large amount of collected particulate matter (PM) is accumulated in the DPNR 10, the filter is clogged and the back pressure in the exhaust gas is increased to the extent that the engine performance is lowered. Therefore, a PM regenerating process in which the temperature of the filter is increased to remove the collected particulate matter by oxidation is performed.

In either of the SOx regenerating process or the PM regenerating process according to the first and second embodiments, the energy of the exhaust gas is increased by increasing the engine load and engine speed to increase the temperature of the exhaust gas. Then, by introducing the high-temperature exhaust gas into the DPNR 10, the temperature of the DPNR 10 is increased to a temperature at which the PM regenerating process or the SOx regenerating process may be performed.

Battery charge control in this hybrid vehicle is next described. When the amount of charge in the battery 7 is small, the ECU 20 performs charge control. That is, the engine load and engine speed is increased to increase the amount of electricity to be generated by the generator 6, and the generated electric power is supplied to the battery.

The charging state/discharging state of electric power to and from the battery 7 is controlled by controlling the amount of electricity generated by the generator 6. That is, the ECU 20 controls the amount of electricity generated by controlling the driving of the generator 6 by the engine 1, and controls the charging state/discharging state of electric power to and from the battery 7 by adjusting the relation between the amount of charge to the battery 7 and the amount of discharge from the battery 7.

As described above, in this hybrid vehicle, the engine load and engine speed is increased to perform a PM regenerating process, an SOx regenerating process and a battery charging process. Because the operating conditions of the engine 1 are forcibly changed when these processes are performed, the driveability or the fuel efficiency of the vehicle may deteriorate if these processes are frequently performed.

Therefore, in the first and second embodiments, the PM regenerating process or the SOx regenerating process and the battery charging process are performed as simultaneously as possible to decrease the frequency of the control that increases the engine load and engine speed.

Figure 2:
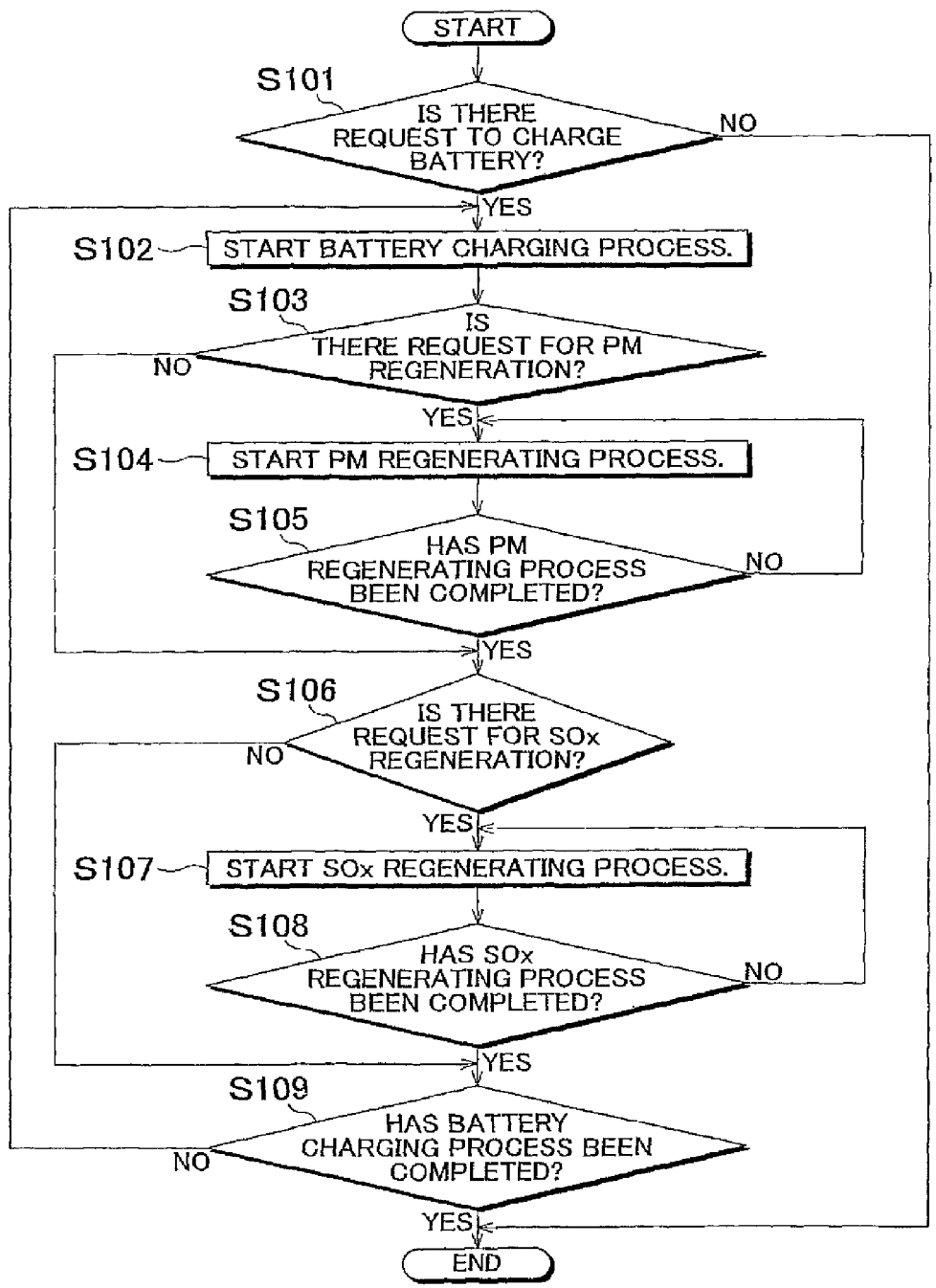
FIG. 2 shows a flowchart of a battery charging routine 1 in the first embodiment of the present invention.

FIG. 2 shows a flowchart of a first battery charging routine 1 in the first embodiment. The first battery charging routine 1 is a program stored in the ROM of the ECU 20, and is executed at predetermined intervals by the ECU 20 when the power switch of the hybrid vehicle is ON.

When the first battery charging routine 1 is started, it is first determined whether a request to charge the battery 7 has been issued in step S101. Here, the presence or absence of a request to charge the battery 7 is determined based on whether a battery charge request flag is ON. The battery charge request flag is set to ON when an output from the charge amount sensor 15 is read into the ECU 20 and the amount of charge is equal to or less than, for example, 50% of the maximum amount of charge (the value 50% as a threshold is hereinafter referred to as "threshold charge amount"). If it is determined that a battery charge request has not been issued here, the first battery charging routine 1 is then ended. If it is determined that a battery charge request has been issued, the first battery charging routine 1 proceeds to step S102.

In step S102, the battery charging process is started. More specifically, in the battery charging process, the engine load and engine speed are set to Q1 and N1, respectively. Fixed values obtained experimentally in advance or values corresponding to the output value from the charge amount sensor 15 read from a map may be used as the values Q1 and N1. When step S102 is completed, the routine proceeds to step S103.

In step S103, it is determined whether a request for PM regeneration has been issued. Here, whether a request for PM regeneration has been issued is determined based on whether a PM regeneration request flag is ON. The PM regeneration request flag may be set to ON when an output from a differential pressure sensor (not shown) provided upstream and downstream of the DPNR 10 is read into the ECU 20 and the amount of accumulated PM, which is estimated from the differential pressure, is determined to be equal to or greater than a threshold PM accumulation amount obtained experimentally in advance or may be set to ON when the distance that the vehicle traveled after the previous PM regenerating process is counted and the amount of accumulated PM estimated from the travel distance is determined to be equal to or greater than the threshold PM accumulation amount.

If it is determined that a request for PM regeneration has not been issued, the routine proceeds to step S106 because no PM regenerating process is performed. If it is determined that a request for PM regeneration has been issued, the routine proceeds to step S104.

In step S104, the PM regenerating process is started. More specifically, the engine load and engine speed may be changed to Q2 and N2, respectively. That is, when the engine load and engine speed necessary to remove the PM in the DPNR 10 by oxidation are greater than the engine load Q1 and the engine speed N1, respectively, necessary to charge the battery 7, the engine load and engine speed may be changed to those necessary to remove the PM in the DPNR 10 by oxidation. When the engine load and engine speed necessary to remove the PM in the DPNR 10 by oxidation are, respectively, equal to or smaller than the engine load Q1 and the engine speed N1 necessary to charge the battery 7, the engine load and engine speed may be maintained at Q1 and N1, respectively. The engine load Q2 and the engine speed N2 necessary to remove the PM in the DPNR 10 by oxidation may be fixed values obtained experimentally in advance, or values corresponding to the output from the differential pressure sensor or the distance traveled after the previous PM regenerating process may be read from a map. When step S104 is completed, the routine proceeds to step S105.

In step S105, it is determined whether the PM regenerating process has been completed. The PM regeneration may be determined to be completed when the output value from the differential pressure sensor is equal to or smaller than a PM regeneration completing differential pressure obtained experimentally in advance or when the duration of the PM regenerating process is equal to or longer than a PM regeneration completing period obtained experimentally in advance.

If it is determined that the PM regenerating process has been completed in step S105, the routine proceeds to step S106. If it is determined that the PM regenerating process has not been completed yet, the routine returns to the upstream side of step S104 and the PM regenerating process is continued.

In step S106, it is determined whether a request for SOx regeneration has been issued. More specifically, it is determined whether an SOx regeneration request flag is ON. The SOx regeneration request flag may be set to ON when the amount of SOx stored in the DPNR 10, which is estimated from an output value from an NOx sensor (not shown) provided downstream of the DPNR 10, becomes equal to or greater than a threshold SOx storage amount obtained experimentally in advance or may be set to ON when the amount of SOx estimated from the distance that the vehicle traveled after the previous SOx regenerating process becomes equal to or greater than the threshold SOx storage amount.

If it is determined that there is no request for SOx regeneration in step S106, the routine proceeds to step S109. If it is determined that there is a request for SOx regeneration, the routine proceeds to step S107.

In step S107, the SOx regenerating process is started. More specifically, after changing the engine load and engine speed to Q3 and N3, respectively, a rich spike control, in which a reducing agent is supplied from a reducing agent adding device (not shown) to the DPNR 10 in a spike manner, is executed. That is, the engine load Q3 and the engine speed N3 necessary to increase the temperature of the DPNR 10 to a temperature sufficiently high to reduce and release the SOx stored in the DPNR 10 are greater than the engine load Q1 and the engine speed N1 necessary to charge the battery 7 as well as the engine load Q2 and the engine speed N2 necessary for the PM regenerating process, the engine load and engine speed may be changed to Q3 and N3, respectively.

When the engine load Q3 and the engine speed N3 necessary to increase the temperature of the DPNR 10 to a temperature sufficiently high to reduce and release the SOx stored in the DPNR 10 are lower than the engine load and engine speed currently set, the engine load and engine speed may be maintained at the current values. The engine load Q3 and the engine speed N3 may be fixed values obtained experimentally in advance, or values corresponding to the output from the NOx sensor or the distance traveled after the previous SOx regenerating process may be read from a map. When step S107 is completed, the routine proceeds to step S108.

In step S108, it is determined whether the SOx regenerating process has been completed. The SOx regenerating process may be determined to be completed when the output value from the NOx sensor is equal to or smaller than an SOx regeneration completing concentration obtained experimentally in advance or when the duration of the SOx regenerating process is equal to or longer than a regeneration completing period obtained experimentally in advance.

If it is determined that the SOx regenerating process has been completed in step S108, the routine proceeds to step S109. If it is determined that the SOx regeneration process has not been completed yet in step S108, the routine returns to the upstream side of step S107 and the SOx regenerating process is continued.

Then, in step S109, it is determined whether the battery charging process has been completed. The battery charging process may be determined to have been completed when, for example, the output value from the charge amount sensor 15 is 95% or higher of full charge or when the duration of the battery charging process is equal to or longer than a battery charge completing period obtained experimentally in advance. If it is determined that the battery charging process has not been completed yet in step S109, the routine returns to the upstream side of step S102. If it is determined that the battery charging process has been completed, the first battery charging routine 1 is then ended.

As described above, in the first battery charging routine 1, when a battery charging process is performed, the engine load and engine speed are increased and the presence or absence of a request for the PM regenerating process and a request for the SOx regenerating process is determined. When there is a request for the PM regenerating process or SOx regenerating process, the state in which the engine load and engine speed have been increased is also used for the process.

Therefore, the opportunities where the engine load and engine speed is increased independently from the driver's intention may be reduced as much as possible to reduce the opportunities for deterioration of the driveability of the hybrid vehicle as much as possible, and the fuel efficiency can be improved.

Next, a second battery charging routine 2, according to the first embodiment is described. The second battery charging routine 2 is similar to the first battery charging routine 1 in that the presence or absence of a request for the PM regenerating process and a request for the SOx regenerating process is determined when a battery charging process is performed, but differs in that a step of decreasing the value of the threshold PM accumulation amount to determine whether to issue a request for the PM regenerating process and a step of decreasing the value of the threshold SOx storage amount as a criterion to determine whether to output a request for the SOx regenerating process are included before determining the presence or absence of a request for the PM regenerating process and before determining the presence or absence of a request for the SOx regenerating process, respectively.

Figure 3:
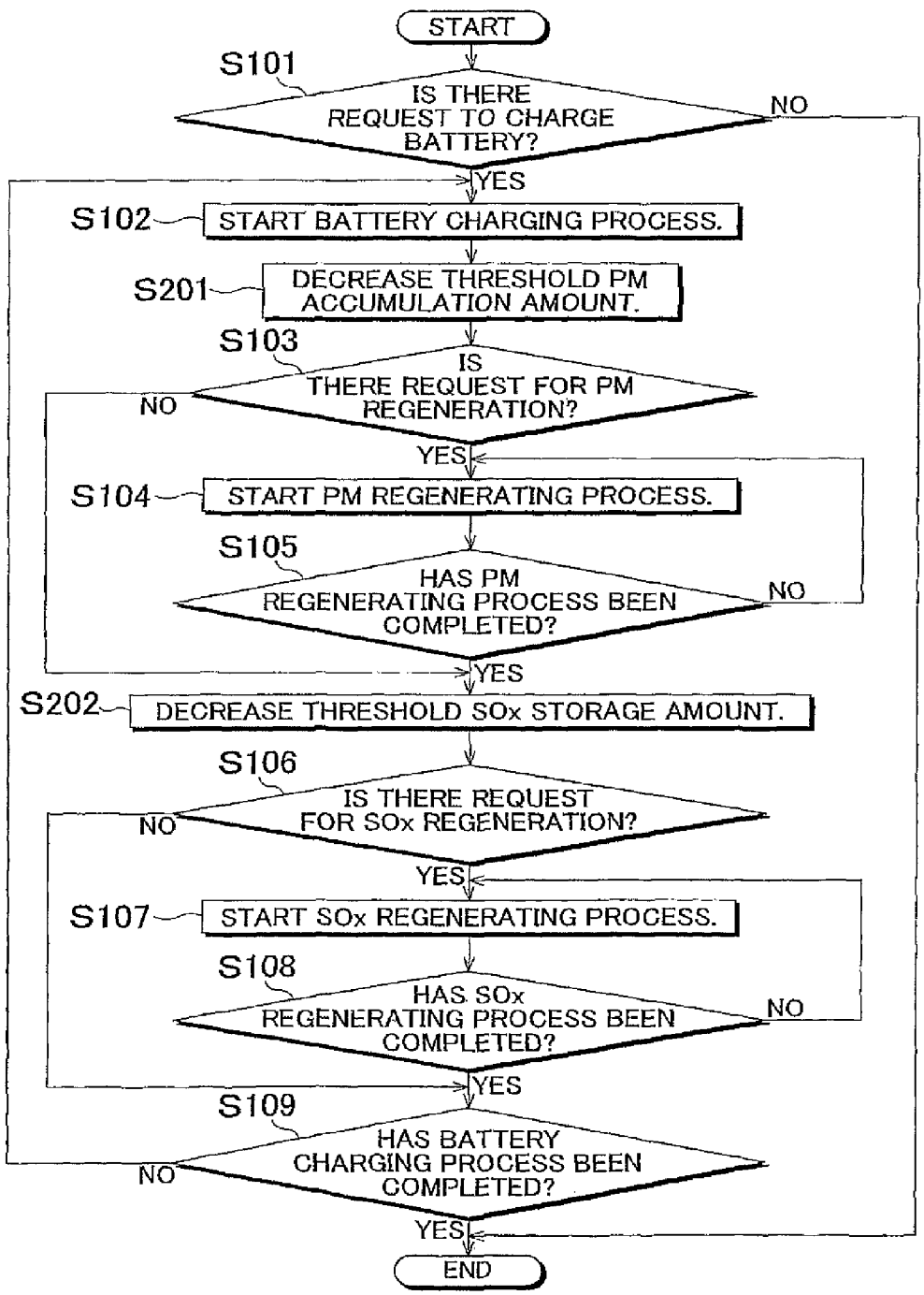
FIG. 3 shows a flowchart of a battery charging routine 2 in the first embodiment of the present invention.

FIG. 3 shows a flowchart of a second battery charging routine 2 according to the first embodiment. The second battery charging routine 2 differs from the first battery charging routing 1 in that step S201 is inserted before step S103 and step S202 is inserted before step S106. Here, only the differences between the first and second battery charging routine 1 and 2, respectively, are described.

In step S201, the threshold PM accumulation amount, used to determine whether to issue a request for PM regeneration, is decreased. For example, the threshold PM accumulation amount may be decreased to 80% of the value used in the battery charging routine. After decreasing the value of the threshold PM accumulation amount, the routine proceeds to step S103 and it is determined whether there is a request for PM regeneration.

In step S202, the threshold SOx storage amount, used to determine whether to issue a request for SOx regeneration, is decreased. For example, the threshold SOx storage amount may be decreased to 80% of the value used in the battery charging routine. After decreasing the value of the threshold SOx storage amount, the routine proceeds to step S106 and it is determined whether there is a request for SOx regeneration.

As described above, in the second battery charging routine 2, before determining the presence or absence of a request for PM regeneration or a request for SOx regeneration, the condition to determine whether to issue a request is relaxed. Thus, a state in which a request for PM regeneration or a request for SOx regeneration is more likely to be issued than in a normal state can be established.

Therefore, the probability that the battery charging process and the PM regenerating process or the SOx regenerating process can be performed simultaneously is increased, and the driveability and the fuel efficiency of the hybrid vehicle can be improved more reliably.

In the above, when the ECU 20 performs steps S104, S105, S107 and S108, it functions as the regenerating means according to the present invention. When the ECU 20 performs steps S102 and S109, it functions as the charging means according to the present invention. Finally, when performing steps S102, S103 and S106, the ECU 20 functions as the second multitasking means according to the present invention.

While the threshold PM accumulation amount is used as a criterion to determine whether to set the PM regeneration request flag to ON and the threshold SOx storage amount is used as a criterion to determine whether to set the SOx regeneration request flag to ON in the above, the history of operating conditions of the engine 1 may be used as an additional criterion. Here, either of the threshold PM accumulation amount or the threshold SOx storage amount may be regarded as a prescribed amount of accumulated matter in the present invention. Also, any of the criteria including these values and the history of operating conditions of the engine 1 may be regarded as a second execution conditions in the present invention.

A second embodiment of the present invention is next described. In the second embodiment, the presence or absence of a request for the battery charging process is determined during a PM regenerating process in contrast to the first embodiment.

Figure 4:
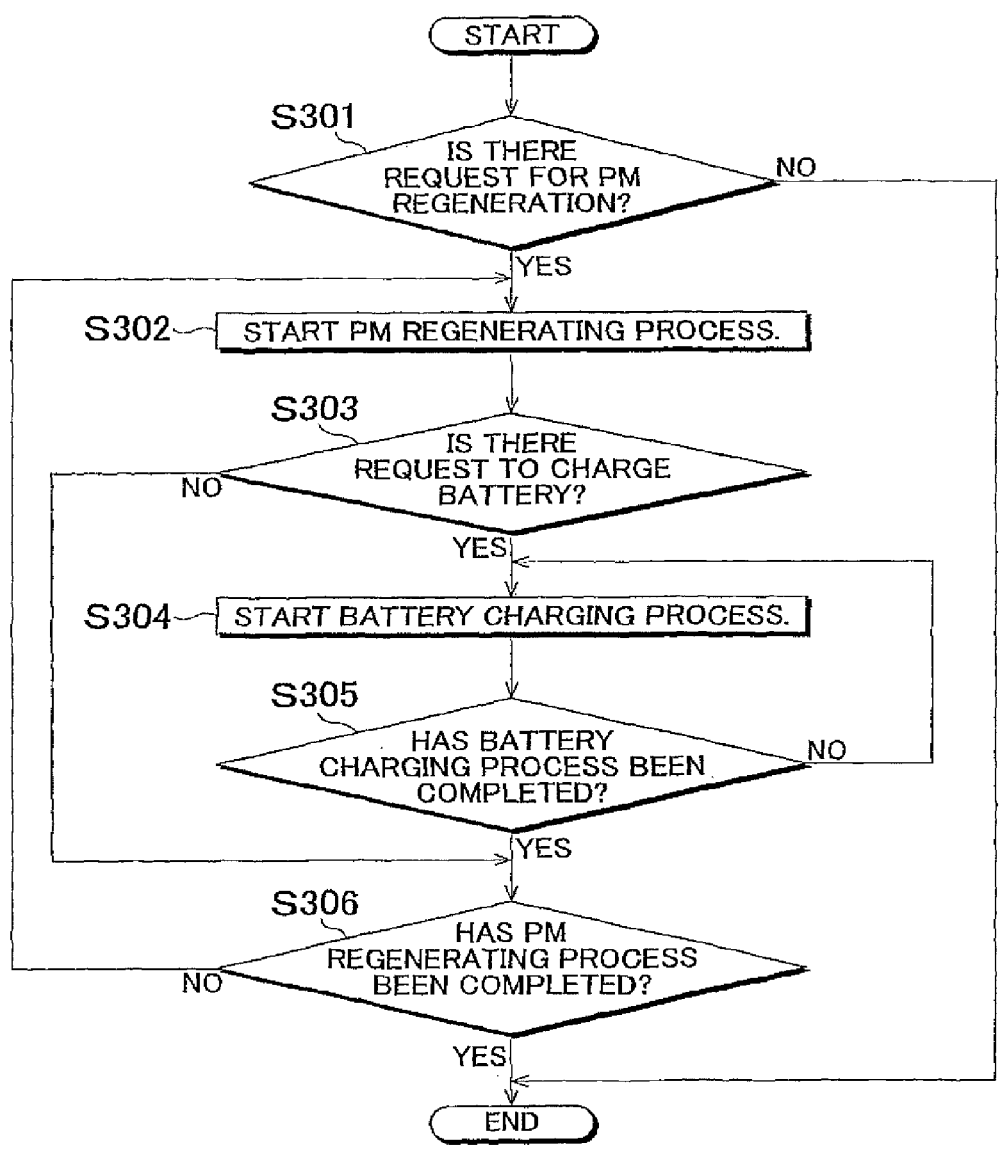
FIG. 4 shows a flowchart of a PM regenerating routine 1 in the second embodiment of the present invention.

FIG. 4 shows a flowchart of a first PM regenerating routine 1 according to the second embodiment. When the first PM regenerating routine 1 is started, it is first determined whether a request for PM regeneration has been issued in step S301. Whether a request for PM regeneration has been issued is determined based on whether the PM regeneration request flag is ON, as in the first embodiment. If it is determined that a request for PM regeneration has not been issued, the first PM regenerating routine 1 ends. If it is determined that a request for PM regeneration has been issued, the routine proceeds to step S302.

In step S302, the PM regenerating process is started. More specifically, the engine load and engine speed may be changed to Q2 and N2, respectively. This control is the same as the process in step S104 in the first embodiment. When step S302 is completed, the routine proceeds to step S303.

In step S303, it is determined whether a request to charge the battery 7 has been issued. Here, the presence or absence of a request to charge the battery 7 is determined based on whether a battery charge request flag is ON, as in the first embodiment. If it is determined that a battery charge request has not been issued here, the routine proceeds to step S306. If it is determined that a battery charge request has been issued, the routine proceeds to step S304.

In step S304, the battery charging process is started. More specifically, the engine load and engine speed are set to Q1 and N1, respectively. As the values Q1 and N1, fixed values obtained experimentally in advance may be used or values corresponding to the output value from the charge amount sensor 15 may be read from a map. When the values Q2 and N2 are greater than the values Q1 and N1, respectively, the engine load and engine speed may be maintained at Q2 and N2, respectively. When step S304 is completed, the routine proceeds to step S305.

In step S305, it is determined whether the battery charging process has been completed. The battery charging process may be determined to have been completed when, for example, the output value from the charge amount sensor 15 is 95% or higher of full charge or when the duration of the battery charging process is equal to or longer than a battery charge completing period obtained experimentally in advance. If it is determined that the battery charging process has not been completed yet here, the routine returns to the upstream side of step S304 and the battery charging process is continued. If it is determined that the battery charging process has been completed, the routine proceeds to step S306.

In step S306, it is determined whether the PM regenerating process has been completed. The PM regeneration may be determined to have been completed when the output value from the differential pressure sensor is equal to or smaller than a PM regeneration completing differential pressure obtained experimentally in advance or when the duration of the PM regenerating process is equal to or longer than a PM regeneration completing period obtained experimentally in advance.

If it is determined that the PM regenerating process has not been completed yet in step S306, the routine returns to the upstream side of step S302 and the PM regenerating process is continued. If it is determined that the PM regenerating process has been completed, the routine is then ended.

As described above, in this routine, the presence or absence of a battery charge request is determined when a PM regenerating process is performed in contrast to the first embodiment, and, if there is a battery charge request, a battery charging process is performed simultaneously with the PM regenerating process. The driveability and fuel efficiency of the engine 1 can be also improved by this control.

In the second embodiment, the threshold charge amount as a criterion to determine whether to issue a battery charge request may be also increased before determining the presence or absence of a battery charge request.

FIG. 5 shows a flowchart of a second PM regenerating routine 2 in the above case. In this routine, step S401 is inserted before step S303. In step S401, the threshold charge amount, used to determine whether to issue a battery charge request (to set the battery charge request flag to ON), is increased. For example, the threshold charge amount is increased from 50% shown in the first embodiment to 60%.

Then, a state in which a battery charge request is more likely to be issued can be established, and the probability that a PM regenerating process and a battery charging process can be simultaneously performed is increased. As a result, the driveability and the fuel efficiency of the engine 1 can be improved more reliably.

In the second embodiment, when performing steps S302 and S303, the ECU 20 functions as the first multitasking means of the present invention.

While the threshold charge amount is used as a criterion to determine whether to set the battery charge request flag to ON in the second embodiment, the rate of decrease in the amount of charge in the battery 7 and the duration of use of the battery 7 itself may be added as other criteria. Here, the threshold charge amount may be regarded as a prescribed charge amount in the second embodiment. Also, any of the criteria including the value, the rate of decrease in the amount of charge in the battery 7 and the duration of use of the battery 7 may be regarded as a first execution condition in the present invention.

Also, in the above, it is needless to say that the control device of the hybrid vehicle may use both the first and second battery charging routines and the first and second PM regenerating routines.

In the first and second embodiments, the control in which the engine load and engine speed are increased to increase the temperature of the DPNR 10 in a PM regenerating process or SOx regenerating process is described as an example, the concept of the present invention may be applied to the control in which a reducing agent is added from upstream of the DPNR 10 to increase the temperature of the DPNR 10 in a PM regenerating process or SOx regenerating process. In this case, the engine load and engine speed have been increased for the battery charging process and therefore the temperature of exhaust gas from the engine 1 has been increased to some extent, the amount of reducing agent to be added from upstream of the DPNR 10 can be reduced. Improvement of the fuel efficiency can be expected for this reason as well.

While the invention has been described with criterion to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

The invention claimed is:

1. A control device for a hybrid vehicle that includes:
an internal combustion engine;
an electric motor operable to assist output power of the internal combustion engine;
an exhaust gas purifying device, provided in an exhaust passage, that purifies exhaust gas from the internal combustion engine flowing through the exhaust passage, the exhaust gas purifying device having a purification capacity regenerated by a regenerating process;
a battery for serving at least as a power source to operate the electric motor and charged by electric power supplied during a charging process; and
a power generator for generating electric power proportional to an engine load or engine speed and supplying the electric power to the battery during the charging process;
the control device comprising:
a regenerating portion that is configured to perform the regenerating process by increasing the engine load and/or engine speed based on a request to perform the regenerating process from the exhaust gas purifying device;
a charging portion that is configured to perform the charging process by increasing the engine load and/or engine speed based on a request to perform the charging process from the battery, and
a multitasking portion that is configured to execute the charging process and determines whether execution of the regenerating process is requested when execution of the charging process is requested,
wherein the multitasking portion determines whether execution of the regenerating process is requested after relaxing a prescribed execution condition for determining whether execution of the regenerating process is requested.

2. The control device for a hybrid vehicle according to claim 1,
wherein the execution condition is satisfied when the amount of matter accumulated in the exhaust gas purifying device is equal to or greater than a threshold amount, and the multitasking portion determines the presence or absence of a request to perform a regenerating process after relaxing the prescribed execution condition by decreasing the value of the threshold amount.

3. The control device for a hybrid vehicle according to claim 1, further comprising:
another multitasking portion that is configured to execute the regenerating process and determines whether execution of the charging process is requested when execution of the regenerating process is requested,
wherein the other multitasking portion determines whether execution of the charging process is requested after relaxing another prescribed execution condition for determining whether execution of the charging process is requested.

4. The control device for a hybrid vehicle according to claim 3,
wherein the other execution condition is satisfied when the amount of charge in the battery is equal to or smaller than a threshold charge amount, and the other multitasking portion determines the presence or absence of a request to perform the charging process after relaxing the other prescribed execution condition by increasing the value of the threshold charge amount.

5. A control method for a hybrid vehicle that includes: an internal combustion engine, an electric motor operable to assist output power of the internal combustion engine, an exhaust gas purifying device, provided in an exhaust passage, that purifies exhaust gas from the internal combustion engine flowing through the exhaust passage, the exhaust gas purifying device having a purification capacity regenerated by a regenerating process, a battery for serving at least as a power source to operate the electric motor and charged by electric power supplied during a charging process, a power generator for generating electric power proportional to an engine load or engine speed and supplying the electric power to the battery during the charging process, a regenerating portion for performing the regenerating process by increasing the engine load and/or engine speed based on a request to perform the regenerating process from the exhaust gas purifying device, and a charging portion for performing the charging process by increasing the engine load and/or engine speed based on a request to perform the charging process from the battery,
the control method comprising:
executing the charging process and determining whether execution of the regenerating process is requested when execution of the charging process is requested, wherein whether execution of the regenerating process is requested is determined by a multitasking portion of the hybrid vehicle after relaxing a prescribed execution condition for determining whether execution of the regenerating process is requested.

6. The control method according to claim 5, further comprising:

executing the regenerating process and determining whether execution of the charging process is requested when execution of the regenerating process is requested, wherein whether execution of the charging process is requested is determined by another multitasking portion of the hybrid vehicle after relaxing another prescribed execution condition for determining whether execution of the charging process is requested.

7. The control method according to claim 6, wherein the other execution condition is satisfied when the amount of charge in the battery is equal to or smaller than a threshold charge amount, and the other multitasking portion determines the presence or absence of a request to perform the charging process after relaxing the other prescribed execution condition by increasing the value of the threshold charge amount.

8. The control method according to claim 5, wherein the execution condition is satisfied when the amount of matter accumulated in the exhaust gas purifying device is equal to or greater than a threshold amount, and the multitasking portion determines the presence or absence of a request to perform a regenerating process after relaxing the prescribed execution condition by decreasing the value of the threshold amount.

* * * * *